United States Patent [19]
Keller et al.

[11] Patent Number: 5,780,569
[45] Date of Patent: Jul. 14, 1998

[54] LINEAR CARBORANE-(SILOXANE OR SILANE)-ACETYLENE BASED COPOLYMERS

[75] Inventors: Teddy M. Keller; David Y. Son, both of Alexandria, Va.

[73] Assignee: The United States of America as represented by the Secretary of the Navy, Washington, D.C.

[21] Appl. No.: 337,012

[22] Filed: Nov. 7, 1994

[51] Int. Cl.$^6$ ............................................. C08G 77/56
[52] U.S. Cl. ........................... 528/5; 528/25; 528/32
[58] Field of Search .................................... 528/5

[56] References Cited

U.S. PATENT DOCUMENTS

| | | | |
|---|---|---|---|
| 3,234,288 | 2/1966 | D'Alelio | 260/606.5 |
| 3,397,221 | 8/1968 | Papetti et al. | 260/448.2 |
| 3,457,222 | 7/1969 | Papetti et al. | 260/46.5 |
| 3,457,223 | 7/1969 | Papetti et al. | 260/46.5 |
| 3,542,730 | 11/1970 | Papetti et al. | 260/46.5 |
| 3,661,847 | 5/1972 | Chapman et al. | 260/46.5 E |
| 3,733,298 | 5/1973 | Knollmueller et al. | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37 SB |
| 4,857,490 | 8/1989 | Johnson | 501/96 |
| 4,946,919 | 8/1990 | Johnson | 526/285 |
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |

OTHER PUBLICATIONS

*Inorganic and Organometallic Polymers* M. Zeldin et al. (Eds.), Amer. Chem. Soc. Wash. DC (1988) at –pp. 44, 90.
Efficient "One Pot" Synthesis of Silylene—Acetylene and Disilylene–Acetylene Preceramic *Polymers From Triothoro Ethylene,* IJAde–Maghsoodi et al. J. of Polymer Science: Part A vol. 28, 955 (1990) at p. 958.
*Ceramics via Polymer Pyrolysis,* K.J. Wynne et al 14 Ann. Rev. Mat. Sci. 29 (1984 pp. 297–334.
*High Temperature Siloxane Elastomers,* P. Dvornic et al., Huthig & WSPF Verlag Basel, N.Y. (1990) at pp. 277, 282.
*Poly(Dodecacarborane–Siloxanes),* E. Peters, J. Macromol. Sci–Rev. Macromol. Chem., C17(2), (1979), at pp. 190–199.
*Synthesis and Study of Silylene–Diacetylene Polymers,* Maghsoodi et al. 23 Macromolecules (1990) pp. 4485–4486.
*d–Orbital Effects in Silicon Substituted $\pi$–Electron Systems. Part XII. Some Spectroscopic Properties of Alkyl and Silyl Acetylenes and Polyacetylenes,* H. Bock et al., J. Chem. Soc. (B), (1968) at p. 1159.
*Silylation as a Protective Method for Terminal Alkynes in Oxidative Couplings –A General Scheme of the Parent Polyynes,* Eastmond et al., 28 Tetramedron 4601 (1972), pp. 4601–4616.
*A New Series of Organo Boranes. VI. The Synthesis and Reactions of Some Silyl Neocarboranes,* Papetti et al, 3 Inorg. Chem 1448 (1964) at 1449.
*A New Series of Organo Boranes. VII The Preparation of Poly–m–Carboranylenesiloxanes,* Papetti et al., 4 J. of Polymer Sci.:Part A–1, 1623 (1966) at p. 1630.
*Icosahedral Carboranes. XV. Monomeric Carboranylene Siloxanes,* Scott et al. 9 Inorg. Chem 2597 (1970) at p. 2599.
*Poly|ethynylene (3–n–butyl–2,5–thiophenediyl)–ethynylene|: A Soluble Polymer Containing Diacetylene Units and Its Conversion to a Highly Cross–Linked Organic Solid,* Callstrom et al., 21 Macromolecules 3528–2530 (1988).
*Hypercross–Linked Organic Solids: Preparation from Poly (aromatic diacetylines) and Preliminary Measurements of Their Young's Modulus, Hardness, and Thermal Stability,* Neenan et al., 21 Macromolecules 3525–3528 (1988).

*Primary Examiner*—John C. Bleutge
*Assistant Examiner*—Margaret W. Glass
*Attorney, Agent, or Firm*—Thomas E. McDonnell; Ajay S. Pathak

[57] ABSTRACT

A novel organoboron polymer and its method of preparation is claimed. The organoboron polymer has a backbone having a repeating unit comprising at least one carboranyl group, at least two acetylenic groups, and one or more silyl or siloxanyl groups.

21 Claims, 12 Drawing Sheets

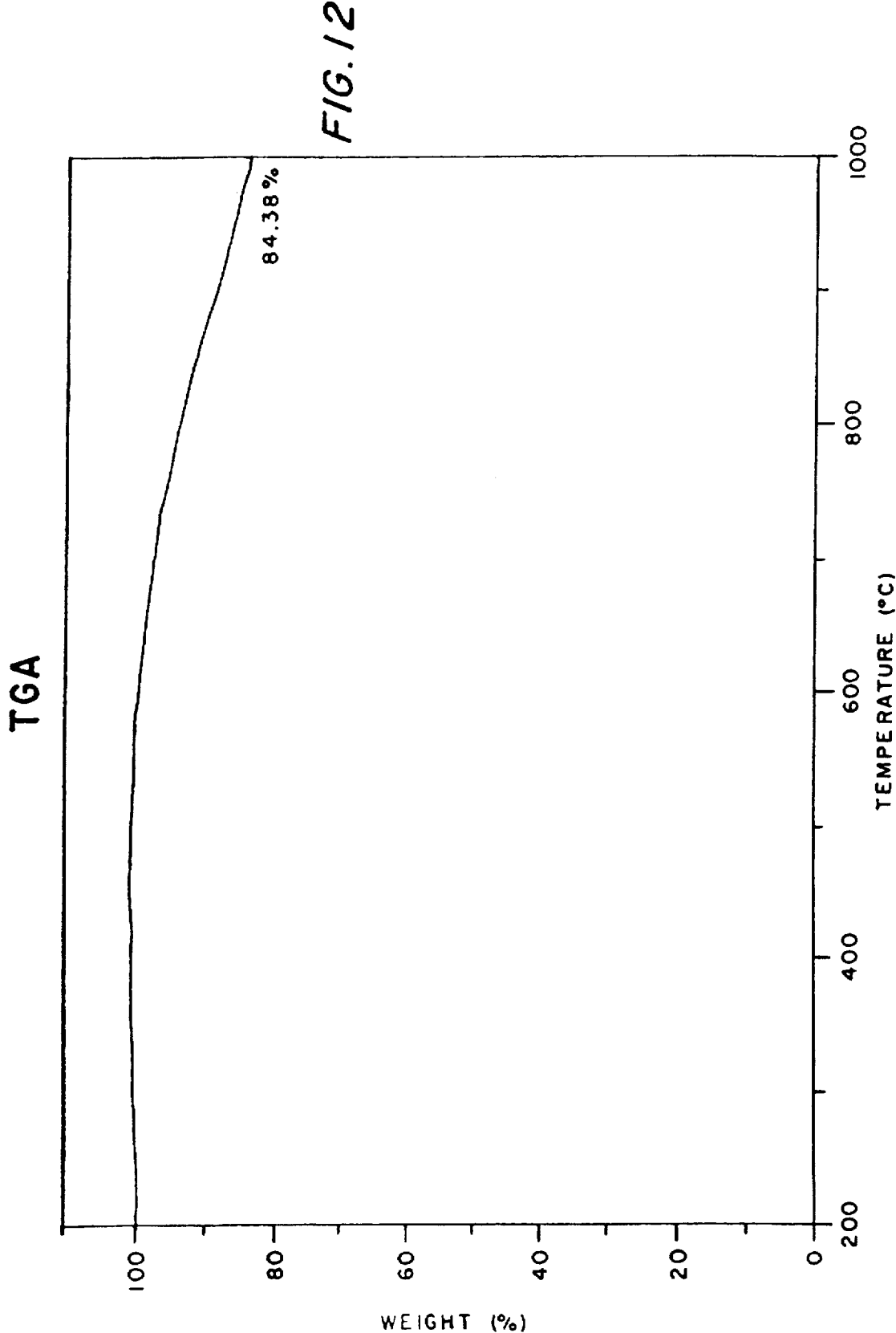

LINEAR CARBORANE-(SILOXANE OR SILANE)-ACETYLENE BASED COPOLYMERS

BACKGROUND OF THE INVENTION

1. Field of the Invention

The present invention generally relates to an organoboron polymer containing a carboranyl group, silyl or siloxanyl groups and alkynyl groups within the backbone of the organoboron polymer. These polymers of varying molecular weight are useful for making further thermosetting polymers and ceramics and are in themselves oxidatively stable at high temperatures.

2. Description of the Related Art

The recent literature reflects continuing major research efforts to advance fundamental knowledge in high temperature material design. See K. J. Wynne and R. W. Rice, *Ceramics Via Polymer Pyrolysis* 14 ANN. REV. MAT. SCI. 297 (1984) incorporated herein by reference in its entirety and for all purposes.

In the search for high temperature oxidatively stable materials considerable attention has been given to polymers containing boron within the polymer. It has been known that the addition of a carborane within a siloxane polymer significantly increases the thermal stability of such siloxane polymers. Polymers having the following general formula have been manufactured:

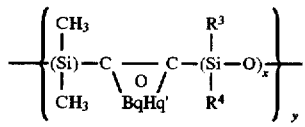

re x and y are positive integers, q and q' are integers from 3 to 16, $CB_qH_qC$ is a carboranyl group, and $R^3$ and $R^4$ are saturated, unsaturated, or substituted hydrocarbons. Whenever applicable, note that both representations, $CB_qH_qC$ and

are used to represent either the ortho, meta or para isomers of the respective carboranyl moieties. Other similar manufactured polymers are polymers having the general formula:

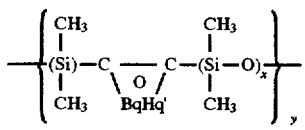

or

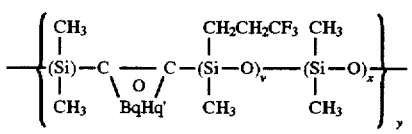

where y is a positive integer, x is a positive integer greater than or equal to 0 ($x \geq 0$), v is a positive integer greater than 0 ($v>0$, or $v \geq 1$), and q and q' are integers from 3 to 16. When $q=q'=10$, these polymers are commonly referred to as $D_x$ or $D_{x+v}-F_{v+1}$, respectively. Another polymer among this class has the formula:

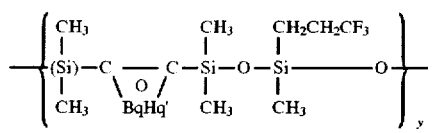

and is referred to separately as $D_2-F_1$. The thermal properties of these polymers are given by PETAR DVORNIC ET AL. in HIGH TEMPERATURE SILOXANE ELASTOMERS published by Huthig & Wepf Verlag Basel, New York (1990) on pp. 277 in FIG. 5.7 and on pp. 282 in FIG. 5.12 and by Edward N. Peters in Poly(dodecacarborane-siloxanes) published in J. MACROMOL. SCI.-REV. MACROMOL. CHEM., C17(2) on pp. 190–199 in FIGS. 3,4,5,6,7,10 and 12, each reference being incorporated herein by reference in its entirety and for all purposes.

Other polymers that have been manufactured have the following formula:

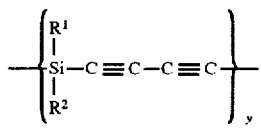

where $R^1=R^2=Me$, or $R^1=R^2=Ph$, or $R^1=Ph$ and $R^2=Me$ and where y is a positive integer. See Maghsoodi et al. in Synthesis and Study of Silylene-Diacetylene Polymers published in 23 MACROMOLECULES pp. 4486 (1990), incorporated herein by reference in its entirety and for all purposes.

Many of the carborane polymers manufactured are cited in various U.S. patents. See, for instance, the following U.S. Pat. Nos.: 4,946,919; 4,269,757; 4,235,987; 4,208,492; 4,145,504; 3,661,847; 3,542,730; 3,457,222; and 3,234,288, each patent being incorporated herein by reference in its entirety and for all purposes. There is an established need for carborane-silane or carborane-siloxane polymeric materials that show high temperature stability wherein total weight loss percentage is limited to 44% or less when first heated, typically, in excess of 400° C. in nitrogen (or air) followed by further heating in an oxidative environment (e.g. air) to a temperature between about 400°–1000° C., inclusive, and wherein the content of the carborane within the polymer can be varied. There is an established need for carborane-silane or carborane-siloxane polymeric materials that show high temperature stability wherein total weight loss percentage is limited to 44% or less when first heated, more typically, in excess of 600° C. in nitrogen (or air) followed by further heating in an oxidative environment (e.g. air) to a temperature between about 600°–1000° C., inclusive, and wherein the content of the carborane within the polymer can be varied. There is a further need to provide carborane-silane or carborane-siloxane polymeric materials wherein the carborane content within the polymers can be varied to provide maximum thermal stability and minimum cost.

In addition, a majority of the carborane-siloxane or carborane-silane polymers made by others show elastomeric properties rather than properties of more rigid polymeric products like thermosetting polymers or ceramics. Thus, in addition to thermal stability, there is also a need for polymers that behave more as thermosets and ceramics, upon further polymerization, and less like elastomeric polymers.

SUMMARY OF THE INVENTION

It is therefore an object of the present invention to provide linear carborane-silane-alkynyl and/or carborane-siloxanealkynyl polymers that show less than 44% total weight loss when heated to temperatures between 400°–1000° C. in an oxidative environment (e.g. air) after heating in nitrogen (or air) to temperatures of 400° C. or greater and wherein the content of carborane within the polymers can be varied.

It is therefore another object of the present invention to provide linear carborane-silane-alkynyl and/or carborane-siloxane-alkynyl polymers that show less than 44% total weight loss when heated to temperatures between 600°–1000° C. in an oxidative environment (e.g. air) after heating in nitrogen (or air) to temperatures of 600° C. or greater and wherein the content of carborane within the polymers can be varied.

It is therefore yet another object of the present invention to provide linear carborane-silane-alkynyl and/or carborane-siloxane-alkynyl polymers wherein the carborane content within the polymers can be varied to provide maximum thermal stability and minimum cost.

It is yet another object of the present invention to provide linear carborane-silane-alknynl and/or carborane-siloxane-alkynyl polymers which can be readily converted into high temperature thermosetting polymers or thermosets, upon further polymerization.

It is even yet another object of the present invention to provide linear carborane-silane-alkynyl and/or carborane-siloxane-alkynyl polymers that have sufficiently low viscosities, at temperatures between 20°–70° C., to readily fill complex dies for making components therefrom.

These and other objects are accomplished by forming linear polymers having the composition:

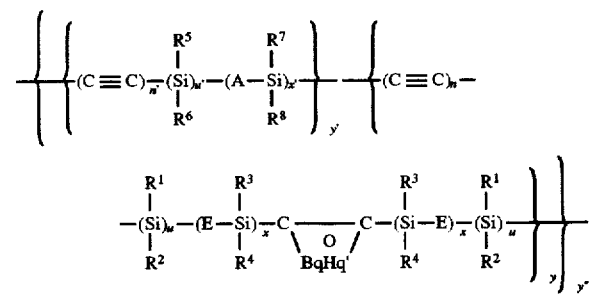

wherein n, n', u, u', x, x', y, y' and y" are integers, wherein the ratio y'/y≠0, wherein A is selected from the group consisting of O, an aliphatic bridge, an aryl bridge or mixtures thereof and E is selected from the group consisting of O, an aliphatic bridge, an aryl bridge or mixtures thereof. In addition, E and/or A may further be selected from the group consisting of an aliphatic bridge of about 1 to about 20 carbon atoms, an aryl bridge of about 5 to 40 carbon atoms, or mixtures thereof. Furthermore, A and E may be the same or different.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein:

FIGS. 1, 2, and 3 are for the polymer having the formula:

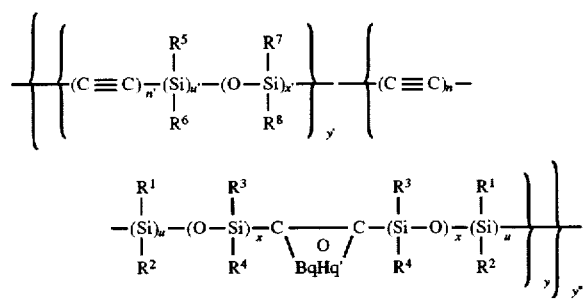

where n'=n=2, q=q'=10, u=u'=x=x'=1, $R^1=R^2=R^3=R^4=R^5=R^6=R^7=R^8=CH_3$ and the ratio y'/y on average is equal to about 1.0.

Figure 4:
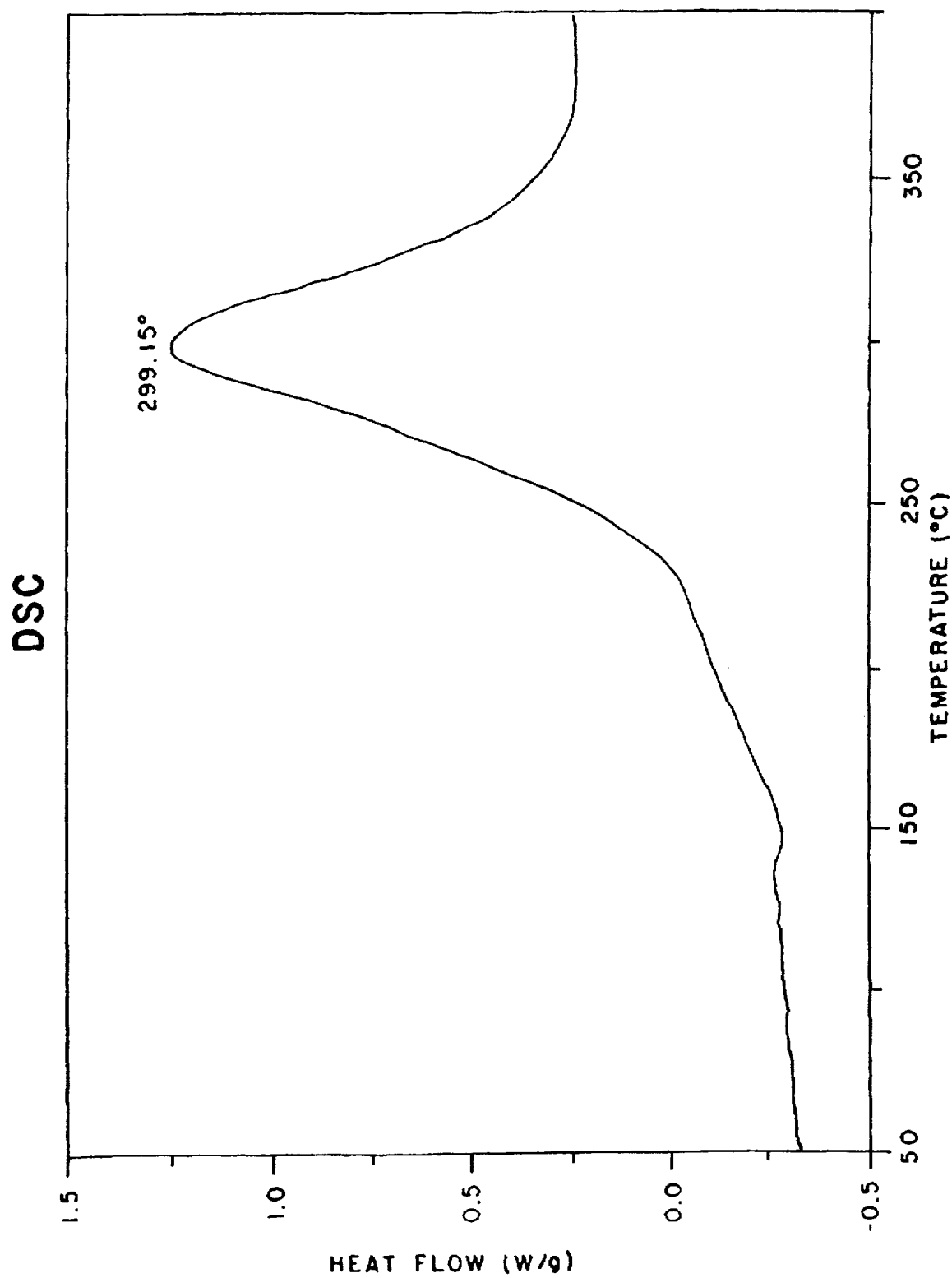

FIG. 4 is a differential scanning calorimetry (DSC) plot of heat flow versus temperature in nitrogen obtained at an exemplary heating rate of 10° C./minute.

Figure 5:
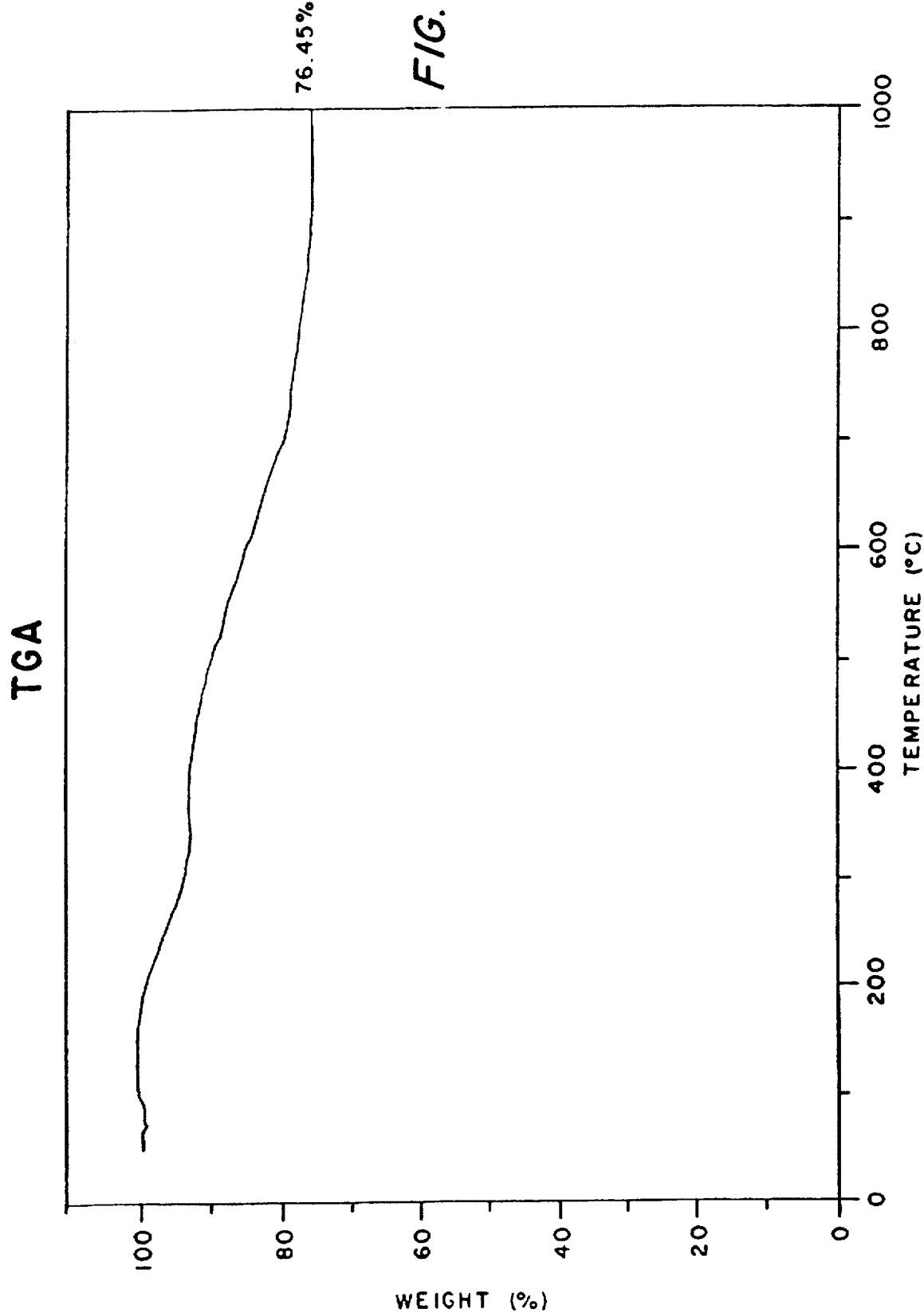

FIG. 5 is a thermogravimetric analytical (TGA) plot of weight % versus temperature in nitrogen obtained on the first heating cycle (e.g. heating from 50° C. to 1000° C. at 10° C./minute).

Figure 6:
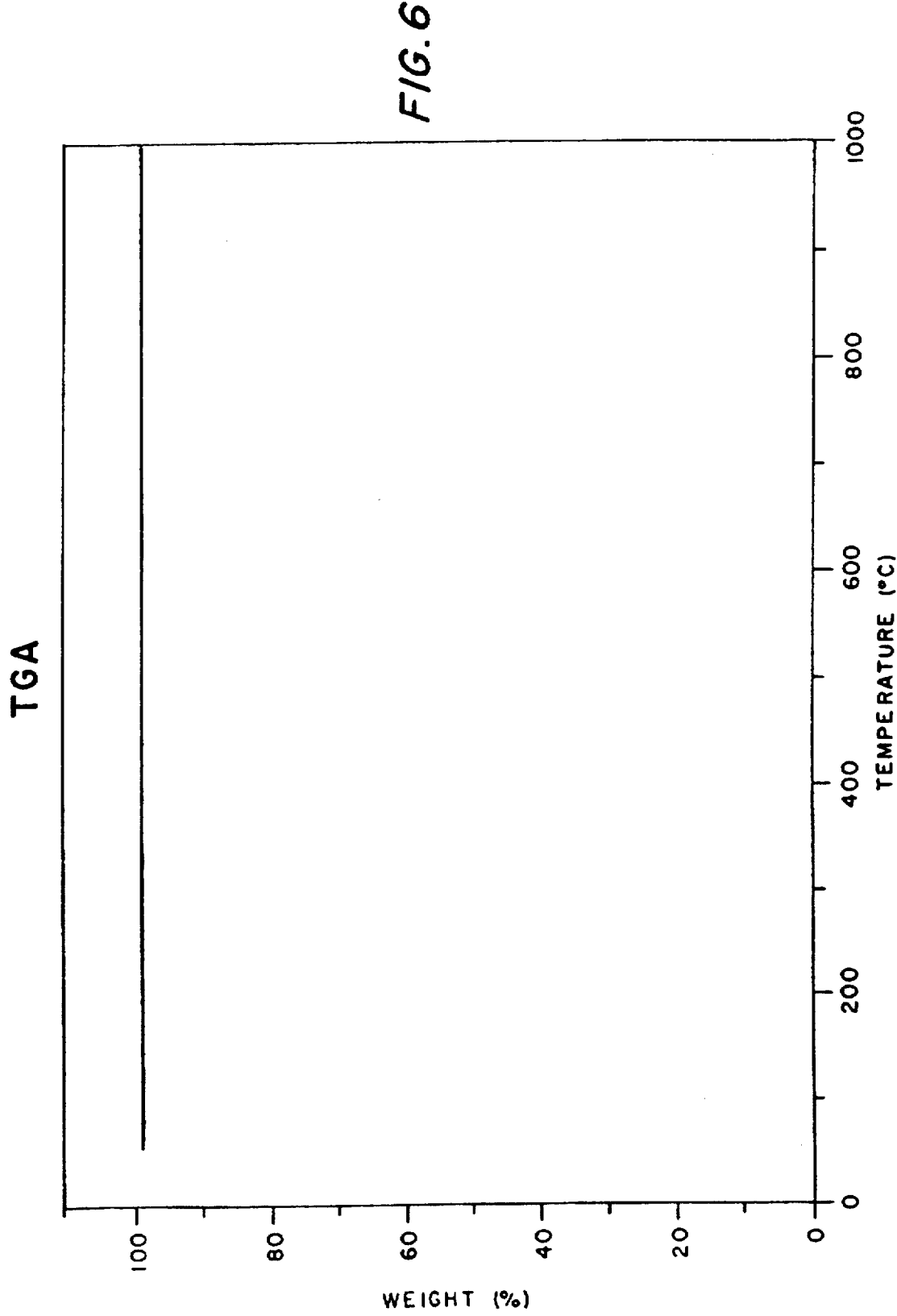

FIG. 6 is a TGA plot of weight versus temperature in an oxidizing environment (air), subsequently obtained on the second heating cycle (e.g. heating from 100° C. to 1000° C. at 10° C./minute).

FIGS. 4, 5, and 6 are for the polymer having the formula:

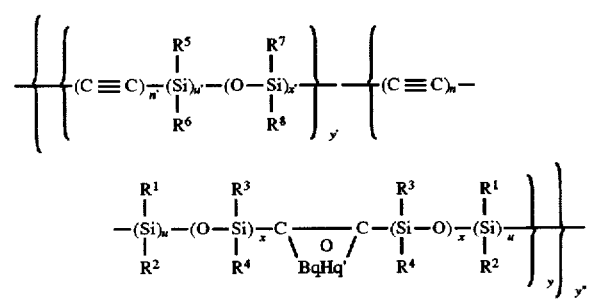

where n'=n=2, q=q'=10, u=u'=x=x'=1, $R^1=R^2=R^3=R^4=R^5=R^6=R^7=R^8=CH_3$ and the ratio y'/y on average is equal to about 3.0.

Figure 7:
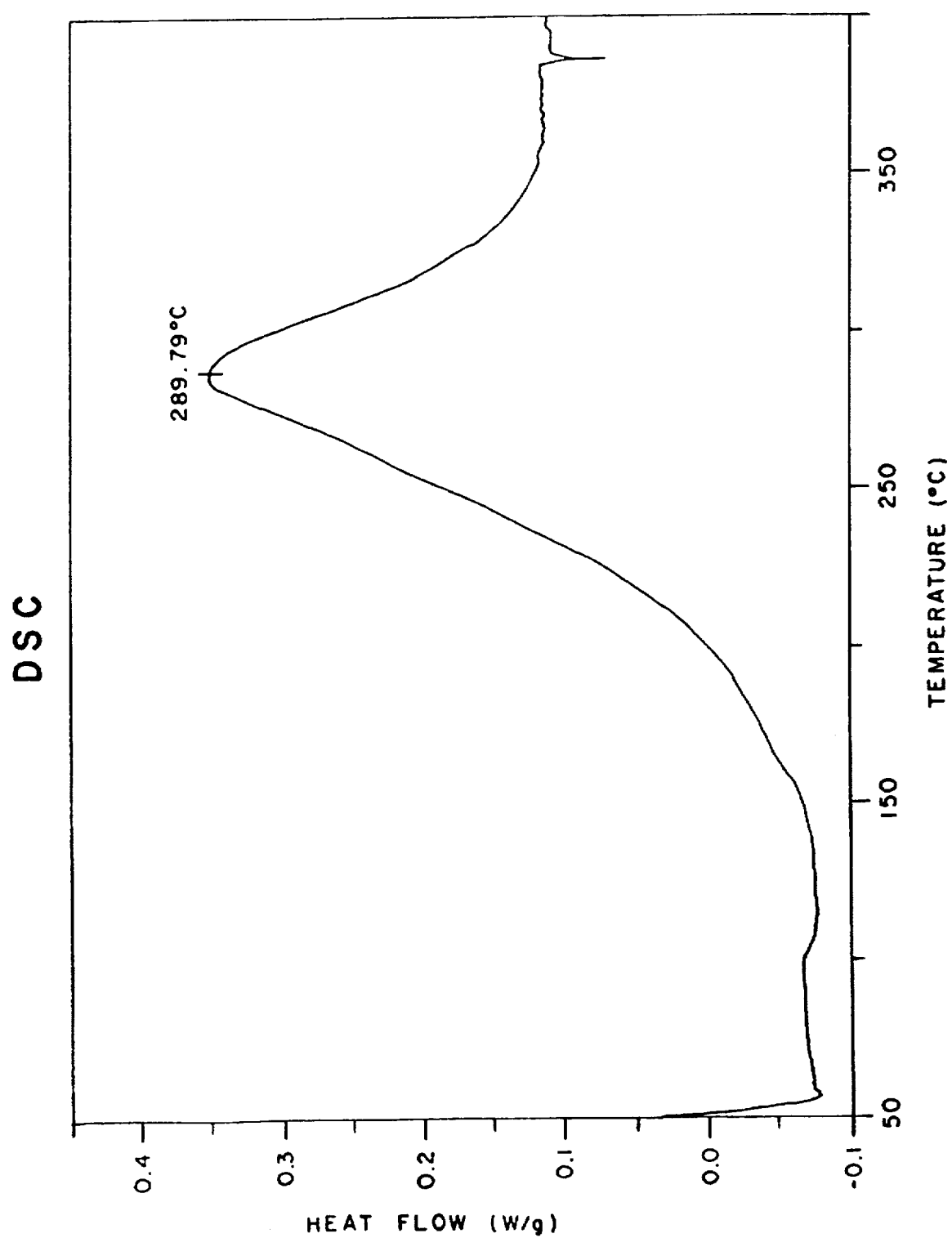

FIG. 7 is a differential scanning calorimetry (DSC) plot of heat flow versus temperature in nitrogen obtained at an exemplary heating rate of 10° C./minute.

Figure 8:
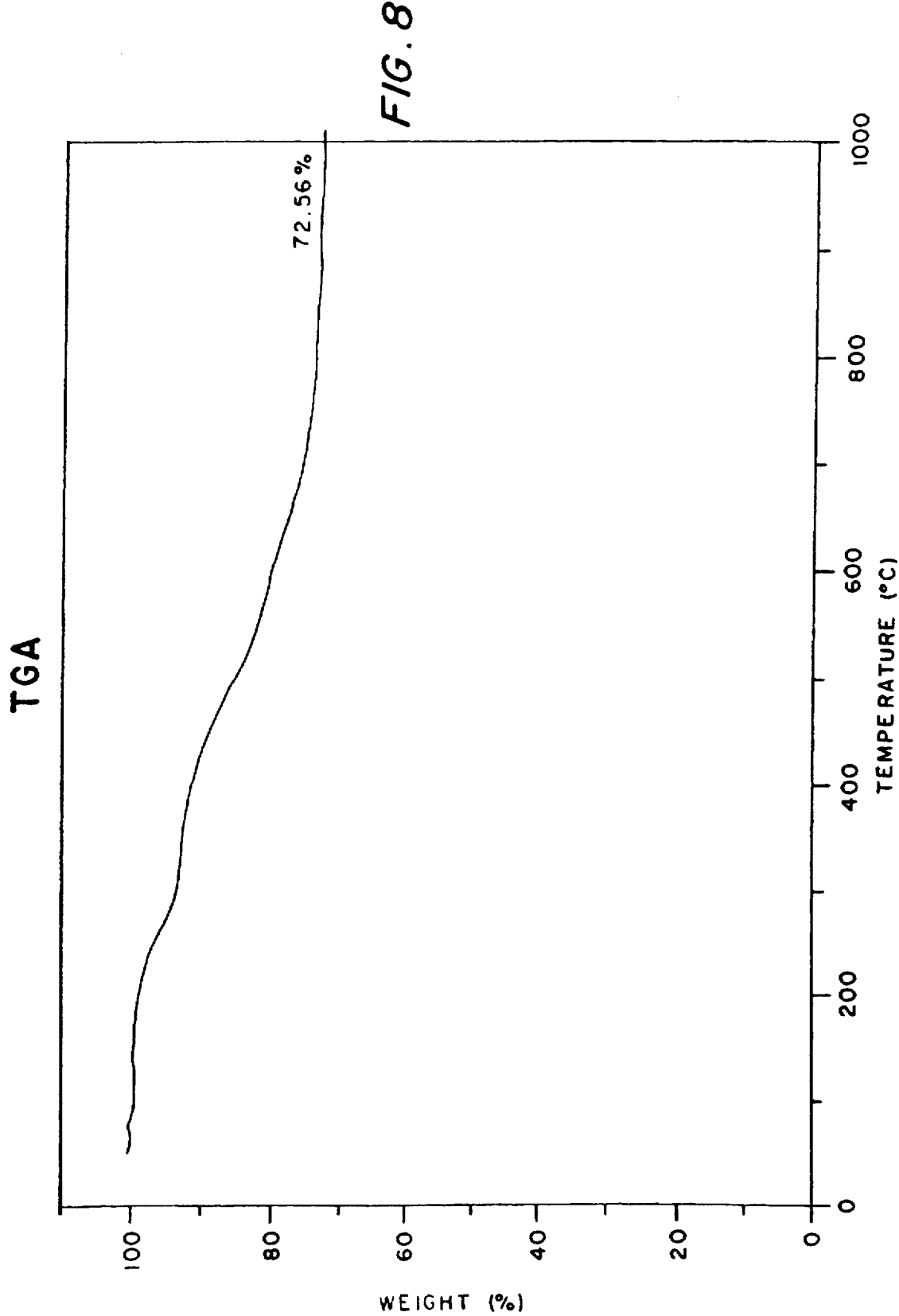

FIG. 8 is a thermogravimetric analytical (TGA) plot of weight % versus temperature in nitrogen obtained on the first heating cycle (e.g. heating from 50° C. to 1000° C. at 10° C./minute).

Figure 9:
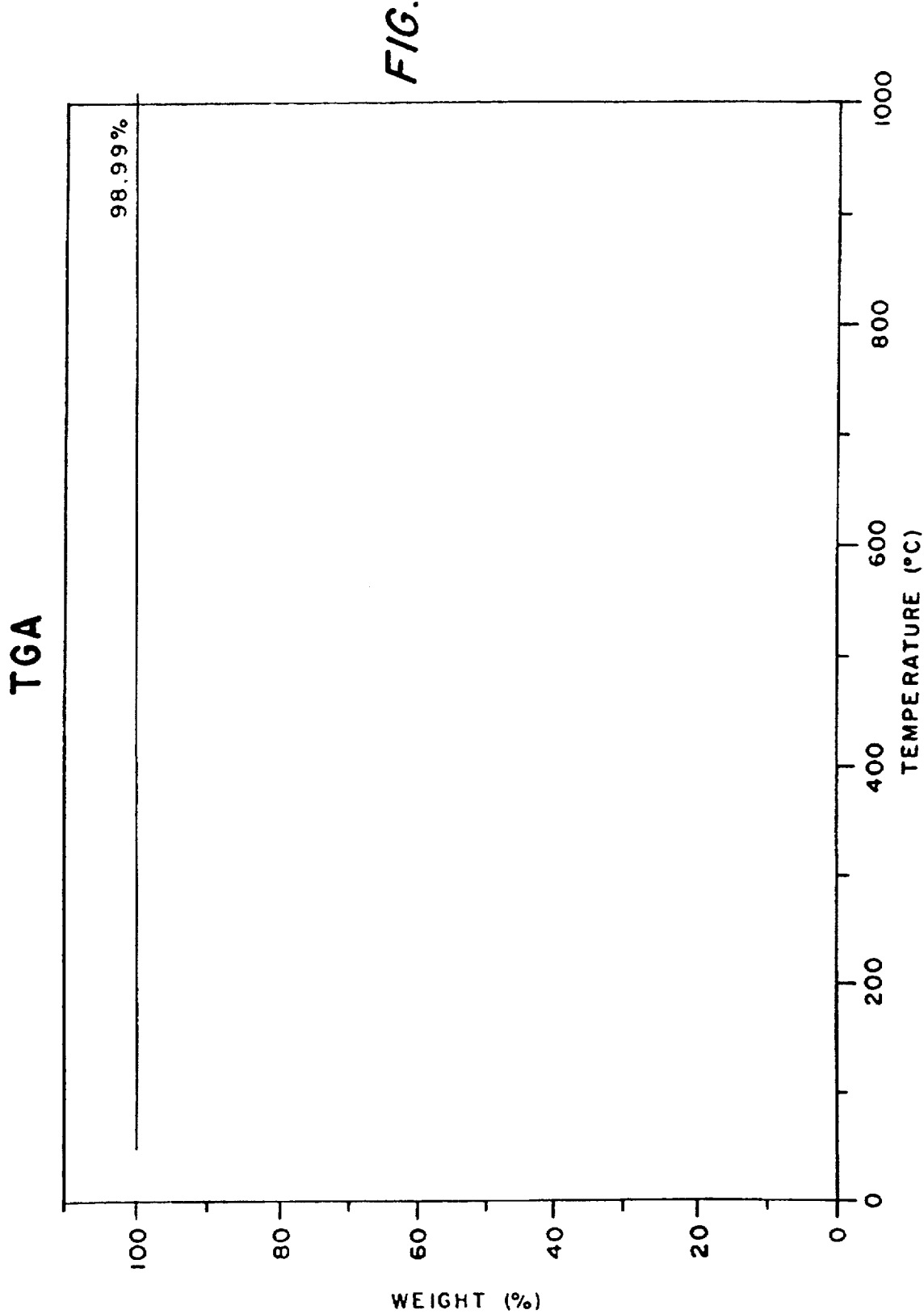

FIG. 9 is a TGA plot of weight versus temperature in an oxidizing environment (air), subsequently obtained on the second heating cycle (e.g. heating from 100° C. to 1000° C. at 10° C./minute).

FIGS. 7, 8, and 9 are for the polymer having the formula:

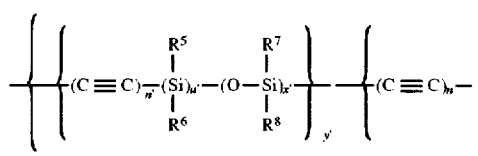

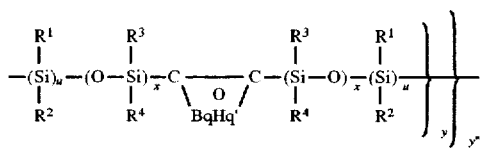

where $n'=n=2$, $q=q'=10$, $u=u'x=x'=1$, $R^1=R^2=R^3=R^4=R^5=R^6=R^7=R^8=CH_3$ and the ratio $y'/y$ on average is equal to about 9.0.

Figure 10:
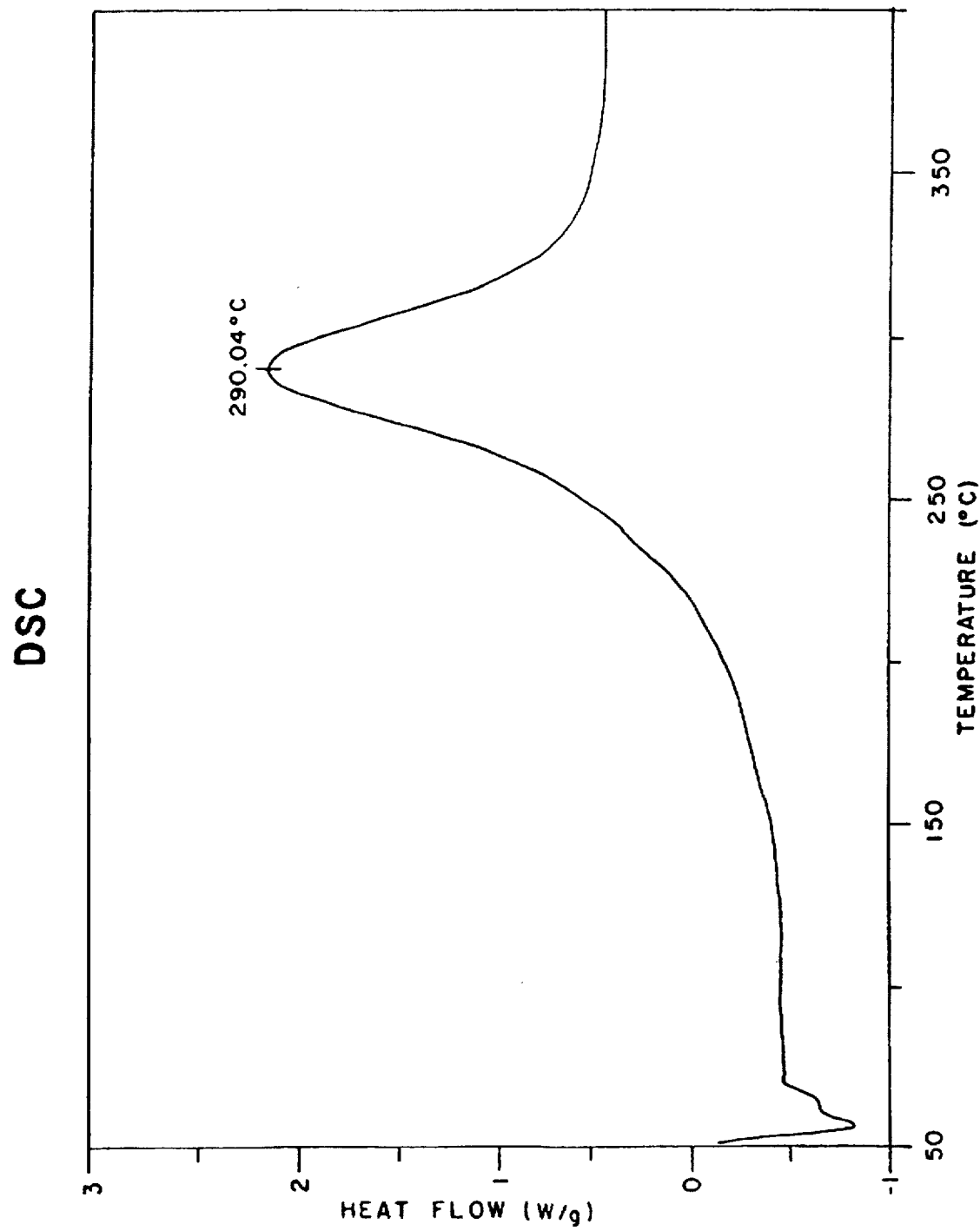

FIG. 10 is a differential scanning calorimetry (DSC) plot of heat flow versus temperature in nitrogen obtained at an exemplary heating rate of 10° C./minute.

Figure 11:
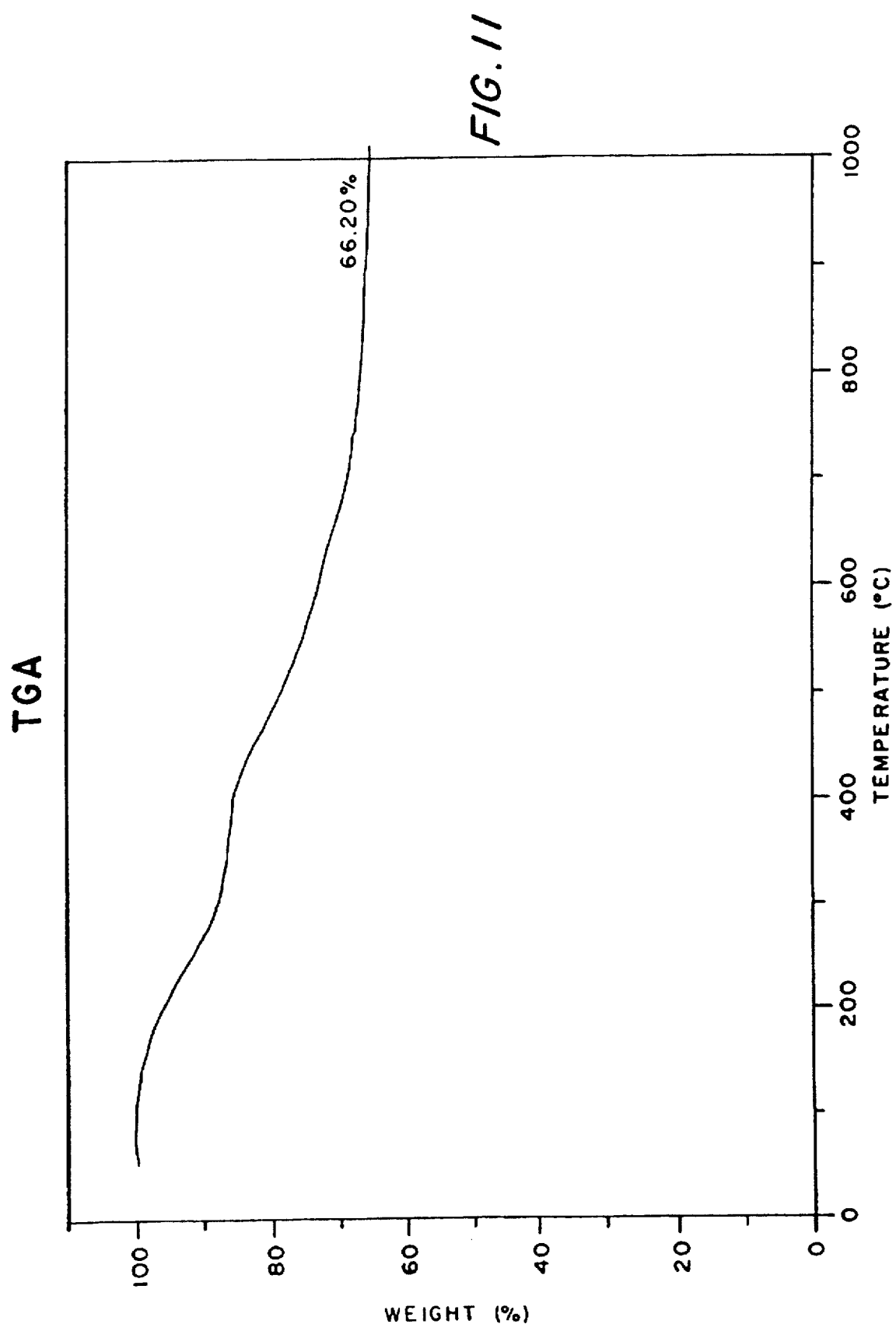

FIG. 11 is a thermogravimetric analytical (TGA) plot of weight % versus temperature in nitrogen obtained on the first heating cycle (e.g. heating from 50° C. to 1000° C. at 10° C./minute).

FIG. 12 is a TGA plot of weight versus temperature in an oxidizing environment (air), subsequently obtained on the second heating cycle (e.g. heating from 100° C. to 1000° C. at 10° C./minute).

FIGS. 10, 11, and 12 are for the polymer having the formula:

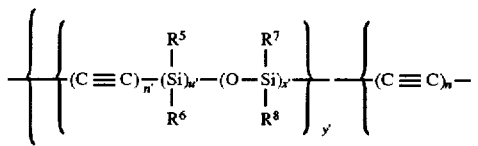

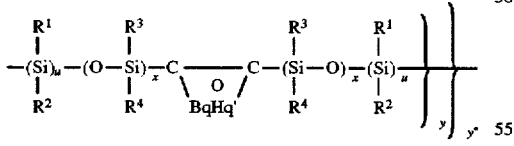

where $n'=n=2$, $q=q'10$, $u=u'=x=x'=1$, $R^1=R^2=R^3=R^4=R^5=R^6=R^7=R^8=CH_3$ and the ratio $y'/y$ on average is equ al to about 19.0.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of novel linear inorganic-organic hybrid polymers of varying molecular weight having the general formula:

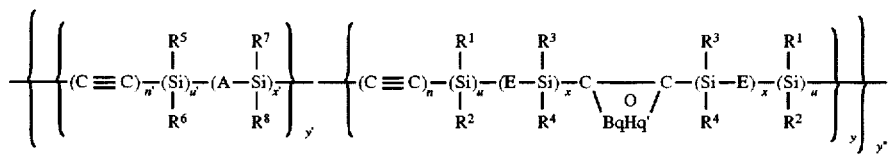

(20)

wherein:

(1) n and n' are integers from 1 to 12 and u, u', y, y' and y" are positive integers;

(2) —(C≡C)$_n$— and —(C≡C)$_{n'}$— represent unconjugated acetylenic moieties or conjugated acetylenic moieties when n and n' are integers greater than 1, respectively;

(3) $R^1$, $R^2$, $R^3$, $R^4$, $R^5$, $R^6$, $R^7$ and $R^8$ are selected from the group consisting of saturated aliphatic, unsaturated aliphatic, aromatic, fluorocarbon moieties and mixtures thereof;

(4)

represents said carboranyl group;

(5) q and q' are integers from 3 to 16;

(6) x and x' represent integers greater than or equal to zero ($x \geq 0; x' \geq 0$);

(7) A is selected from the group consisting of O, an aliphatic bridge, an aryl bridge or mixtures thereof; and (8) E is selected from the group consisting of O, an aliphatic bridge, an aryl bridge or mixtures thereof;

(9) wherein E and A may be the same or different; and

(10) wherein said carboranyl group represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl; closo-dodeca-orthocarboranyl; closo-dodeca-metacarboranyl; closo-dodeca-para-carboranyl and mixtures thereof.

The novel linear inorganic-organic hybrid polymers (20) with repeating units containing at least one alkynyl or acetylenic group and at least one bis(silyl or siloxanyl) carboranyl group are designed to take advantage of the thermo-oxidative stability of inorganics and the processability of organics. While poly(carborane-siloxane) elastomers, silylene-acetylene and silylene-diacetylene polymers have been reported, polymers (20) containing both the carboranyl and acetylenic moieties wherein y'/y≠0 have not been previously reported.

The general chemical scheme for synthesizing these novel linear polymers (20) is represented by the exemplary synthesis of (20') given below:

(9) A is an oxygen atom; and
(10) E is an oxygen atom.

According to the above reaction, the value of y" can be varied, typically, from 1–1000, more often from 1–500 or 1–250, most often from 1–100 or 1–10 and in particular from 1–6. Given the general scheme, step 1 involves forming a salt, for example, the dilithio salt of butadiyne by reacting 4 equivalents of n-BuLi with hexachlorobutadiene. Note that Reagents of the following general formula may be used:

wherein M is selected from the group consisting of Li, Na, K and MgX' where X' is selected from the group consisting

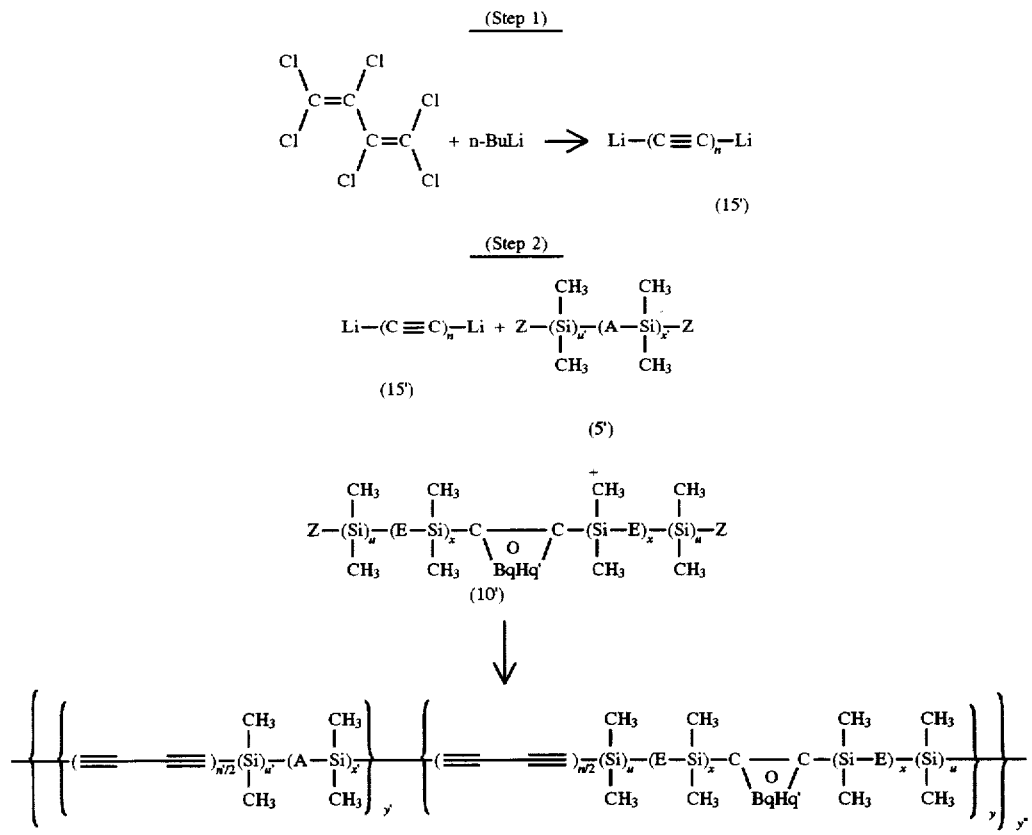

wherein:

(1) n=n'=2, u=u'=x=x'=1, y, y' and y" are positive integers;
(2) —(C≡C)— and —(C≡C)$_n$— represents a conjugated acetylenic moiety where n=n'=2;
(3) R$^1$=R$^2$=R$^3$=R$^4$=R$^5$=R$^6$=R$^7$=R$^8$=CH$_3$;
(4)

represents said carboranyl group; and (5) q=q'=10;
(6) Z is selected from the group consisting of F, Cl, Br, I, and an acety/group;
(7) Li—(C≡C)$_n$—Li represents a dilithio salt where n=2 or n'=2;
(8) n-BuLi represents n-butyllithium;

of F, Cl, Br and I. To form the polymer (20'), wherein y'/y=1.0, step 2 involves reacting the dilithiobutadiyne (15') produced in step 1 with compounds (5') and (10') wherein the molar concentration of (5') equals the molar concentration of (10') and wherein the molar concentrations of (5') and (10'), respectively, equal one-half (½) the molar concentration of the dilithiobutadiyne (15') In general, the following concentrations are used:

(i) molar conc. of (5')+molar conc. of (10')=molar conc. of (15')

(ii) the ratio of y'/y=(molar conc. of (5))/(molar conc. of (10')).

For the formation of polymer (20), the present invention makes the ratio of y'/y variable by the use of appropriate molar ratios of compounds having the formula (5) and (10), infra. In general, the ratio of y'/y is equal to the molar concentration of (5) used divided by the molar concentration of (10) used in forming (20). Thus, if equimolar amounts of (5) and (10), infra, are used, then the ratio of y'/y is about 1.0. If the molar ratios of (5) and (10), infra, used are 1 to 99, respectively, then the ratio of y'/y is about 0.01 in the formed product (20). Typically, the ratio y'/y is between about 0.01 to about 50. More typically, the ratio y'/y is between about 1 to about 25. Most typically, the ratio y'/y is between about 5 to about 15. Preferably, the ratio y'/y is between about 8 to about 12. Most preferably, the ratio y'/y is about 9.

It should be noted that if trichloroethylene is used in step 1 instead of hexachlorobutadiene, a salt of ethyne or acetylene is formed in step 1 where n=1. Consequently, an ethynyl moiety is incorporated into the polymer (20) produced in step 2 where n=n'=1. By using hexachlorobutadiene in step 1, the salt of butadiyne is formed where n=2. In turn, a butadiyne moiety is incorporated into polymer (20') where n=n'=2. In order to form a polymer where n=3, a salt of hexatriyne needs to be formed in step 1. The synthesis of the disodium salt of hexatriyne is given in the article by Bock and Seidl, d-Orbital Effects in Silicon Substituted π-Electron Systems. Part XII Some Spectroscopic Properties of Alkyl and Silyl Acetylenes and Polyacetylenes, J. CHEM. SOC. (B), 1158 (1968) at pp. 1159, incorporated herein by reference in its entirety and for all purposes. Thus, by forming the appropriate alkynyl salt, the length of the alkynyl moiety, represented by the value of n and n', incorporated into the polymer formed in step 2 can be controlled. Typically, the value of n and n' can be varied from 1 to 12. Acetylenic derivatives having the general formula H(C≡C)$_n$H can be readily converted into the dilithio salts by reacting with n-butyllithium. The respective dilithio salts, with values of n varying from 1 to 12, can then be incorporated into the backbone of polymers (20) as shown in the aforementioned step 2. The value of n and n' can be varied, typically, from 1 to 12, more often from 1 to 10 and 1 to 8, most often from 1 to 6 and, in particular, from 1 to 3 and 1 to 2. Acetylenic derivatives having the general formula H(C≡C)$_n$H can be readily formed by the synthesis given by Eastmond et al. in Silylation as a Protective Method for Terminal Alkynes in Oxidative Couplings—A General Synthesis of the Parent Polyynes, 28 TETRAHEDRON 4601 (1972), incorporated herein by reference in its entirety and for all purposes.

Furthermore, a variety of compounds can be produced that have structures similar to that of compound (10') shown in step 1. One variation includes replacing the methyl groups attached to the Si with other hydrocarbon or aromatic moieties. Typical reactions synthesizing disubstituted dichloro silanes of varying size (varying values of u) and having different R groups are known in the art:

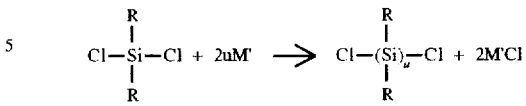

where M' is a group I metal or alloy. The above reaction is cited by ZELDIN ET AL. (EDITORS) in INORGANIC AND ORGANOMETALLIC POLYMERS, published by American Chemical Society, Washington, D.C. (1988) at 44 and 90. The value of u can be varied, typically, from 1 to 1000, more often from 1 to 500 and 1 to 250, most often from 1 to 100 and 1 to 10, and, in particular, from 1 to 6. Another variation includes controlling the values of x in addition to that of u. Similarly, with respect to the synthesis of (5) and (5'), infra, the value of u' can be varied, typically, from 1–1000, more often from 1–500 or 1–250, most often from 1–100 or 1–10 and in particular from 1–6.

Synthesis of a variation of compound (10') where u=1 and x=0 and E=O and Z=Cl is given by Papetti et al. in A New Series of Organoboranes. VI. The Synthesis and Reactions of Some Silyl Neocarboranes, 3 INORG. CHEM. 1448 (1964) at 1449 under the caption "C,C'-Bis(methyldichlorosilyl) neocarborane (IV)", incorporated herein by reference in its entirety and for all purposes. The synthesis of compound (10') where u=1 and x=1 and E=O and Z=Cl is given by Papetti et al. in A New Series of Organoboranes. VII. The Preparation of Poly-m-carboranylenesiloxanes, 4 JOURNAL OF POLYMER SCIENCE: PART A-1, 1623 (1966) at 1630 under the caption "Compound (VII)", incorporated herein by reference in its entirety and for all purposes. Synthesis of a variation of compound (10') where u=1 and x=2 and E=O and Z=Cl is given by Scott et al. in Icosahedral Carboranes. XV. Monomeric Carboranylenesiloxanes, 9 INORG. CHEM. 2597 (1970) at 2599 under the caption "1,7-Bis(5-chlorohexamethyltrisiloxanyl)-m-carborane (IV)", incorporated herein by reference in its entirety and for all purposes.

While leaving u=1, the value of x can be varied, typically, from 0 to 1000, more often from 0 to 500 and 0 to 250, most often from 0 to 10, and, in particular, from 0 to 2 by the following proposed reaction scheme (i.e. the length of the polymer chain within compound (10) is varied according to the following reaction):

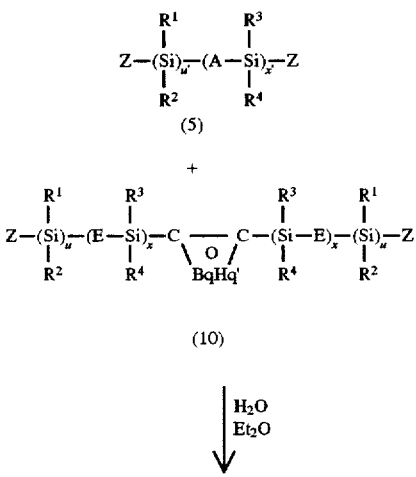

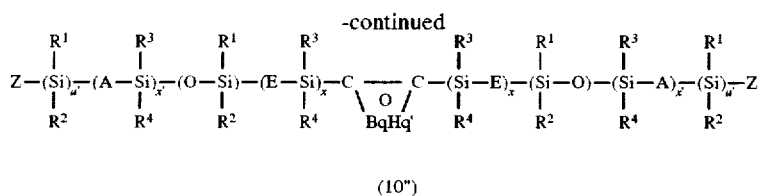

(10″)

where x and x' are integers greater than or equal to 0 ($x \geq 0$; $x' \geq 0$), u' is a positive integer and A is an oxygen atom and E is an oxygen atom.

The value of x can be iteratively increased by reacting compounds (5) and (10) wherein u=u'=1 until the desired integral value of x is obtained; thereafter, further reacting the reaction product (10″) with compound (5) wherein u' is an integer greater than 1 thereby forming product (10) wherein the value of u can be varied to integral values greater than 1 and wherein the value of x has been adjusted to a desired integral value greater than 1. Note that reaction product (10″) is analogous to reactant (10) wherein the values of integrals u and x have been varied.

However, A may be selected from the group consisting of O, an aliphatic bridge, an aryl bridge or mixtures thereof. A may further be selected from the group consisting of an aliphatic bridge of about 1 to about 20 carbon atoms, an aryl bridge of about 5 to about 40 carbon atoms, or mixtures thereof. Furthermore, E may be selected from the group consisting of O, an aliphatic bridge, an aryl bridge or mixtures thereof. E may further be selected from the group consisting of an aliphatic bridge of about 1 to about 20 carbon atoms, an aryl bridge of about 5 to about 40 carbon atoms, or mixtures thereof. In addition, A and E may be the same or different. An exemplary synthesis of compound (10) is shown by the synthesis of exemplary compound (100). Synthesis of exemplary compound (100) wherein $R^1$, $R^2$, $R^3$ and $R^4$ are —CH$_3$, wherein E is —CH$_2$CH$_2$CH$_2$CH$_2$—, wherein x=2, u=1, and q=q'=10 is given in EXAMPLE 10, infra.

The synthesis of (5) is given below:

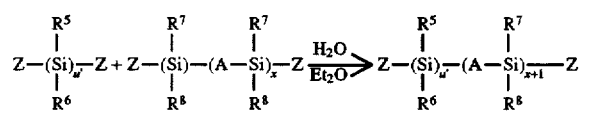

wherein x'=x+1 and A is an oxygen atom and wherein $R^5$, $R^6$, $R^7$, and $R^8$ may be the same or different. The value of x' can be varied, typically, from 0–1000, more often from 0–500 or 0–250, most often, from 0–10 or 0–5, and, in particular, from 0–2.

For the case where A is not an oxygen atom, the synthesis of (5) is given below:

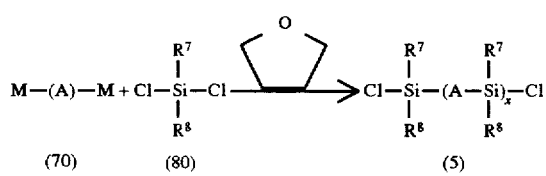

wherein M is selected from the group consisting of Li, Na, K and MgX' where X' is selected from the group consisting of F, Cl, Br and I, wherein $R^7$ and $R^8$ may be the same or different and x is a positive integer. Where the ratio of the molar concentration of (70) to the molar concentration of (80) is equal to about one-half, the value of x is about 1. Where the ratio of the molar concentration of (70) to the molar concentration of (80) is greater than one-half but less than 1, the value of x is greater than 1. When A is not an oxygen atom, to form compound (5), the value of x can be controlled by selecting the appropriate ratio of the molar concentration of (70) to the molar concentration of (80). If the ratio is selected according to ½≦ (molar concentration of (70)/molar concentration of (80))<1, then the integral value of x obtained in compound (5) is proportional to the ratio of the molar concentration of (70) to the molar concentration of (80).

A may be selected from the group consisting of O, an aliphatic bridge, an aryl bridge or mixtures thereof. A may further be selected from the group consisting of an aliphatic bridge of about 1 to about 20 carbon atoms, an aryl bridge of about 5 to about 40 carbon atoms, or mixtures thereof.

Following the scheme in the aforementioned steps 1 and 2, the novel linear polymers (20) can be formed by reacting a salt of an alkyne or a respective Grignard reagent with compounds (5) and (10):

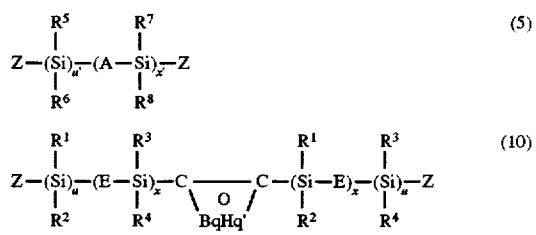

wherein E is selected from the group consisting of O, an aliphatic bridge, an aryl bridge or mixtures thereof and wherein A is selected from the group consisting of O, an aliphatic bridge, an aryl bridge or mixtures thereof.

These novel linear polymers (20) exhibit sufficiently low viscosities either at room temperature or at their respective melting points (i.e. 20–70° C.) to readily fill complex dies or shapes for forming parts therefrom. In addition, these polymers (20) can be further polymerized into thermosets and ceramics that form rigid shapes which are oxidatively stable at high temperatures above 600° C.

The following examples outline preferred embodiments of the present invention.

EXAMPLE 1

Compound (30) is synthesized according to the method of Papetti & Heying. See S. Papetti et al. 3 INORG CHEM 1448 (1964). The structure of compound (30) is given below:

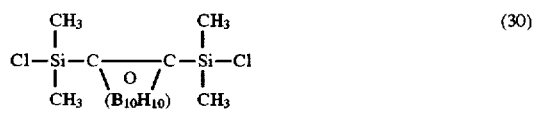

According to the method of Papetti et al., a 100 ml round bottom 3-neck flask was fitted with an addition funnel and septa, flushed with argon, and flamed. The reaction was carried out under an inert atmosphere (argon). Butyllithium (18.0 ml/2.5M in hexanes, 44.9 mmol) was cooled to −78° C. Meta-carborane (2.5902 g, 18.0 mmol) in 10 ml THF was added dropwise. A white solid (dilithiocarborane) formed and the reaction was allowed to warm to ambient temperature. After cooling the reaction mixture back to −78° C., dichlorodimethylsilane (5.5 ml, 43.5 mmol) was added dropwise.

EXAMPLE 2

Experimental Section

General Comments apply to Examples 2–8:

All reactions were carried out in an inert atmosphere unless otherwise noted. Solvents were purified by established procedures. 1,7-Bis(chlorotetramethyldisiloxy)-m-carborane (40) was obtained from Dexsil and used as received. 1,7-Bis(chlorotetramethyldisiloxy)-m-carborane (40) has the following structure:

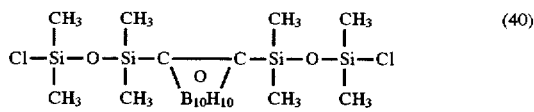

1,3-Dichlorotetramethyldisiloxane (50) was obtained from Silar Laboratories or United Chemical Technologies and used as received. 1,3-Dichlorotetramethyldisiloxane (50) has the following structure:

n-Butyllithium (2.5M in hexane), and hexachlorobutadiene were obtained from Aldrich and used as received. Thermogravimetric analyses (TGA) were performed on a DuPont 951 thermogravimetric analyzer. Differential scanning calorimetry analyses (DSC) were performed on a DuPont 910 instrument. Unless otherwise noted, all thermal experiments were carried out with a heating rate of 10° C./min and a nitrogen flow rate of 50 mL/min.

EXAMPLE 3

Preparation of 1,4-dilithio-1,3-butadiyne:

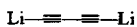

A 50 mL three-necked round-bottomed flask was equipped with a stir bar, glass stopper, septum, and gas inlet tube. After the flask was flame-dried, THF (5 mL) was injected and the flask was placed in a dry ice/acetone bath. n-BuLi (10.6 mL of a 2.5M solution, 26.5 mmol) was then added and the mixture was stirred for 5 min. Subsequently, hexachlorobutadiene (0.99 mL, 6.3 mmol) was added dropwise via syringe. After completion of addition, the cold bath was removed and the mixture was stirred at room temperature for two hours. The resulting dark brown mixture was used without further treatment.

EXAMPLE 4

Preparation of polymer (20') from 50/50 of (40)/(50), respectively (y'/y≈1.0):

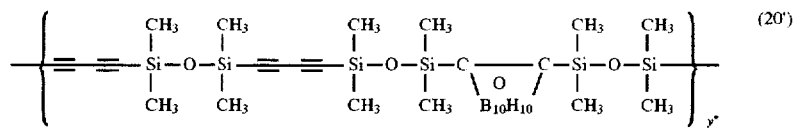

Figure 1:
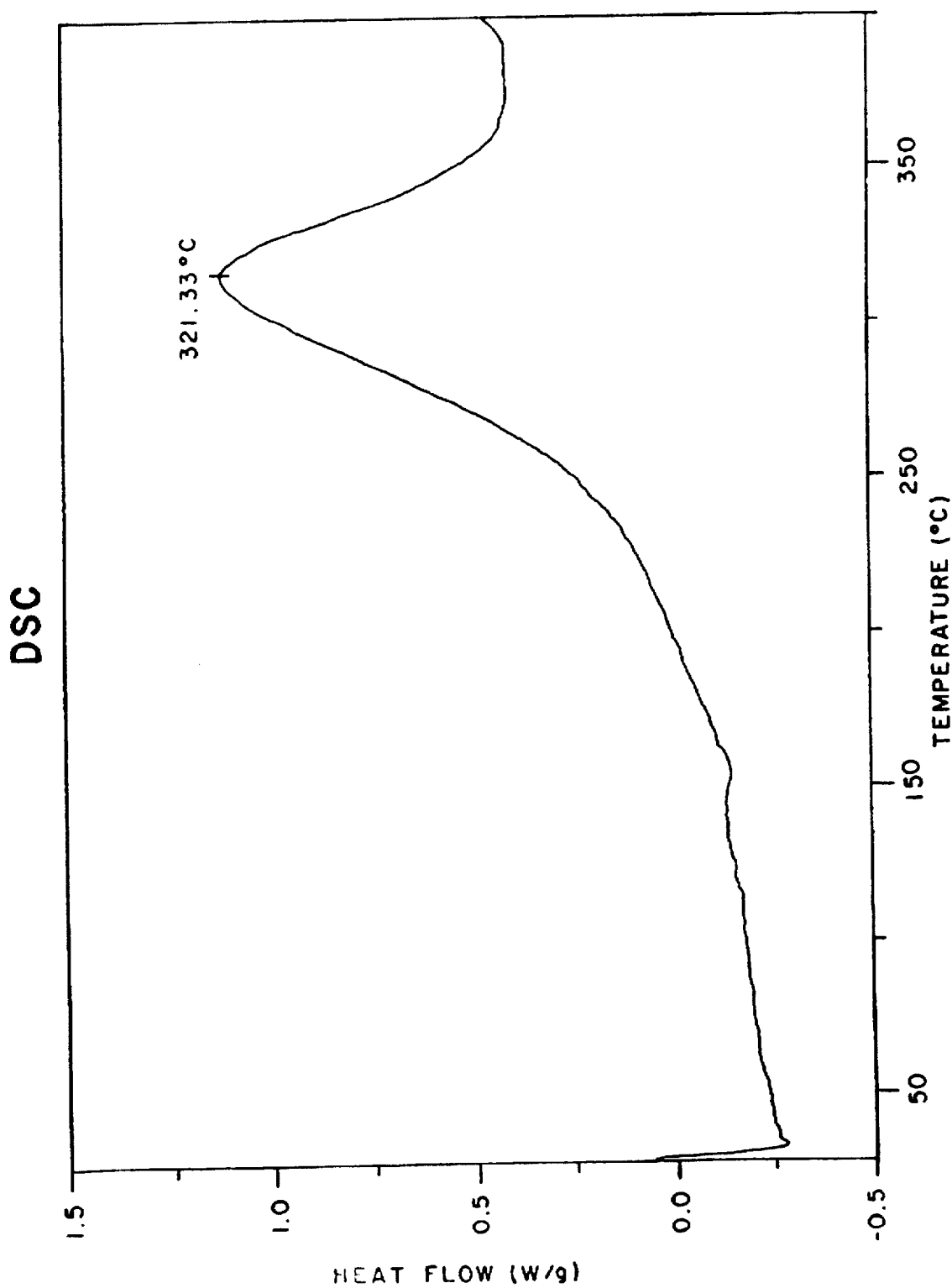
FIG. 1 is a differential scanning calorimetry (DSC) plot of heat flow versus temperature in nitrogen obtained at an exemplary heating rate of 10° C./minute.
Figure 2:
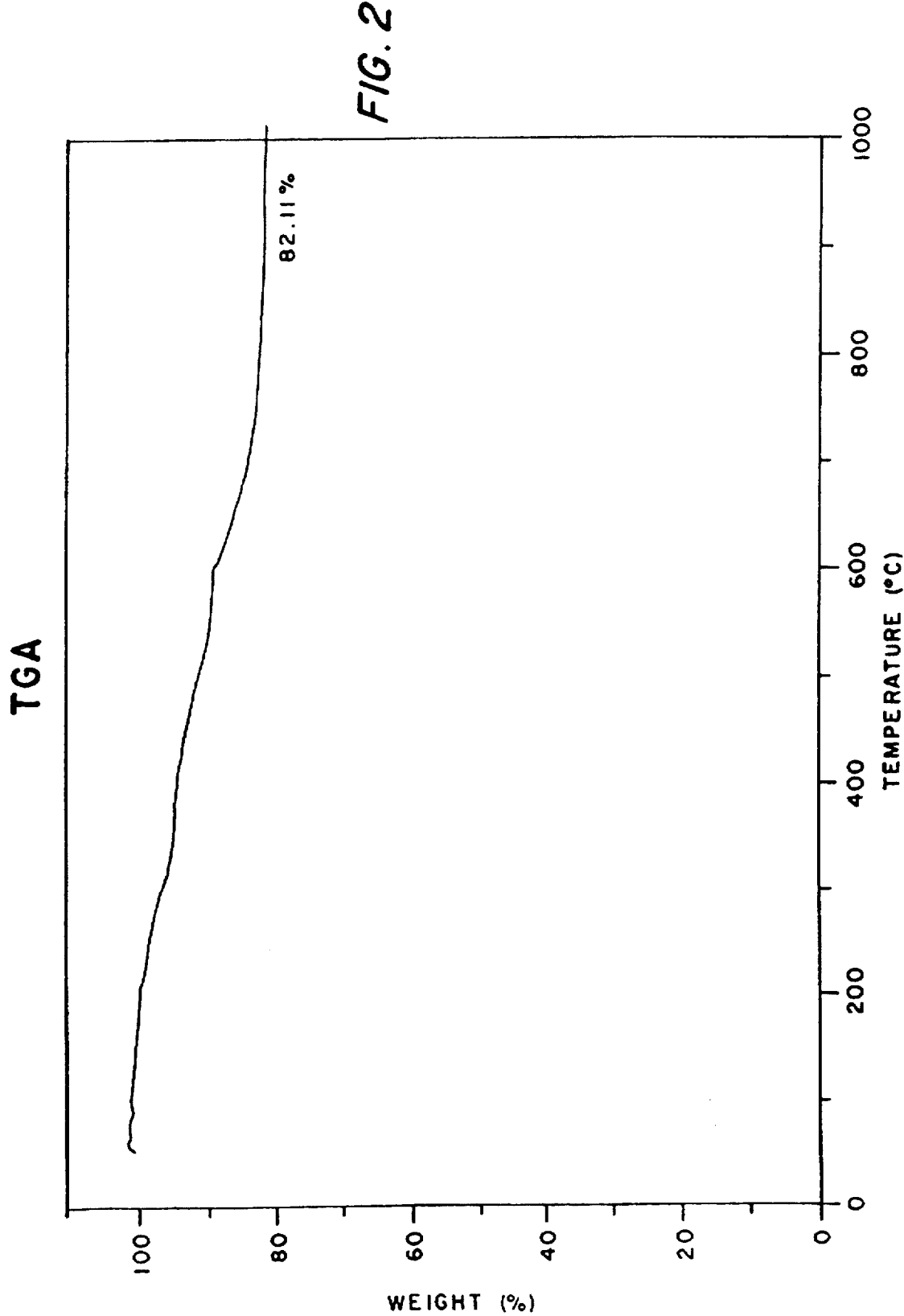
FIG. 2 is a thermogravimetric analytical (TGA) plot of weight % versus temperature in nitrogen obtained on the first heating cycle (e.g. heating from 50° C. to 1000° C. at 10° C./minute).
Figure 3:
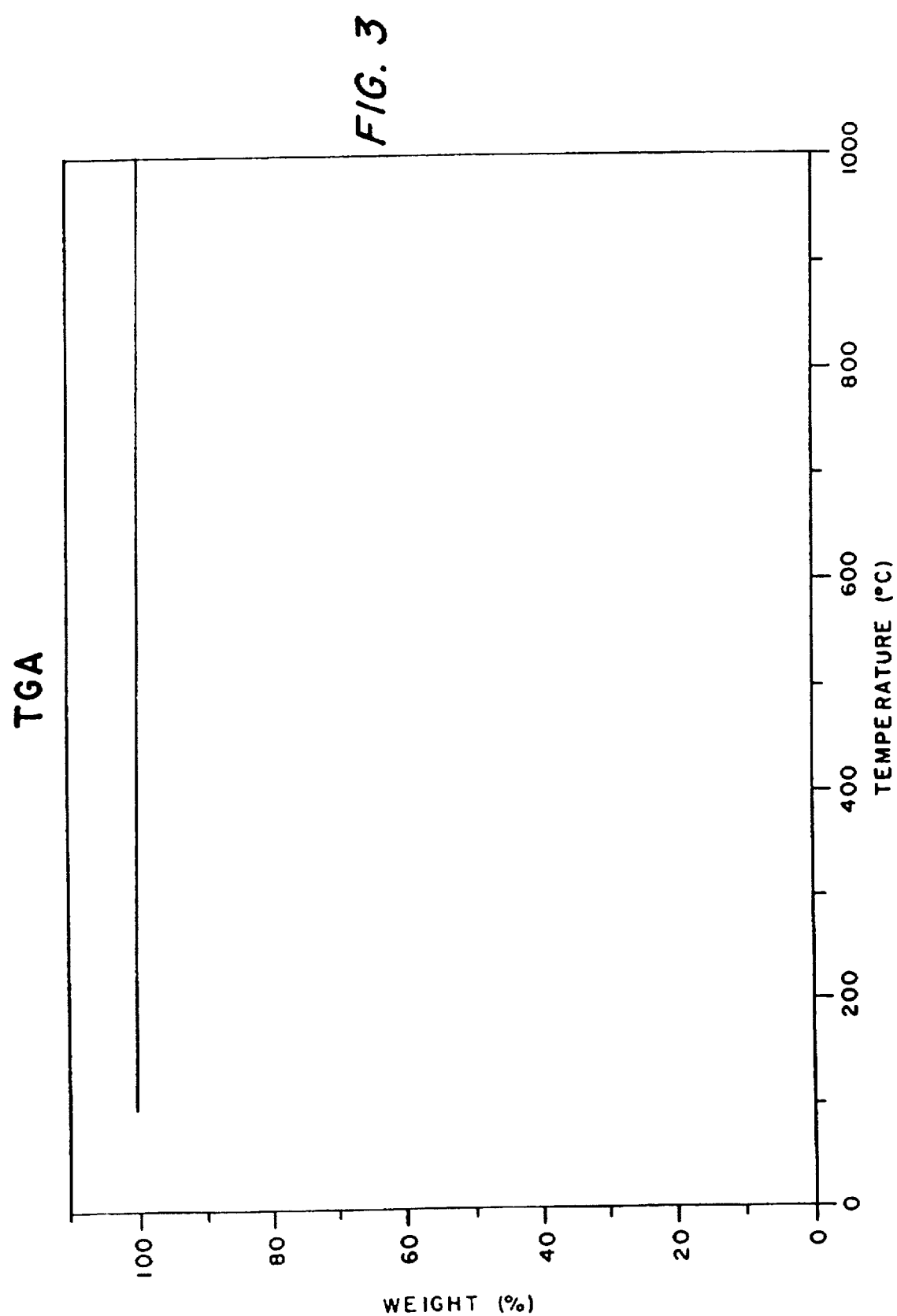
FIG. 3 is a TGA plot of weight versus temperature in an oxidizing environment (air), subsequently obtained on the second heating cycle (e.g. heating from 100° C. to 1000° C. at 10° C./minute).

A mixture of 1,4-dilithio-1,3-butadiyne (6.3 mmol) in THF/hexane was cooled in a dry ice/acetone bath. To this mixture a homogeneous solution of (40) (1.43 mL, 3.15 mmol) and (50) (0.62 mL, 3.15 mmol) was added dropwise over a period of 15 min. After addition, the cold bath was removed and the mixture was stirred at room temperature for two hours. The tan mixture was then poured into an ice-cooled solution of saturated aqueous ammonium chloride (30 mL) with stirring. The resulting two-phased mixture was filtered through a Celite pad and the layers were separated. The aqueous layer was extracted twice with diethyl ether and the combined organic layers were washed twice with distilled water and once with saturated aqueous sodium chloride solution. The organic layer was dried over anhydrous magnesium sulfate and filtered. Most of the volatiles were removed under reduced pressure at room temperature and the residue was heated at 75° C. for three hours at 0.1 mm Hg pressure to leave a viscous dark brown material (1.76 g). $^1$H NMR spectroscopy shows large peaks at δ (ppm) 0.2–0.4 corresponding to the —SiCH$_3$ protons, and a broad resonance from δ(ppm) 1.2–2.8 corresponding to the carborane protons in the polymer. $^{13}$C NMR spectroscopy shows two peaks at δ (ppm) 0.30 and δ (ppm) 1.9 corresponding to the —SiCH$_3$ carbons, a peak at δ (ppm) 68.1 corresponding to the carborane carbons, and two peaks at δ (ppm) 84.8 and δ (ppm) 87.0 corresponding to the two acetylenic carbons in the polymer. Infrared spectroscopic (IR) analysis confirms the presence of the acetylenic groups with a strong peak at 2071 cm$^{-1}$. Other prominent peaks are present at (cm$^{-1}$): 2962 (C—H), 2596 (B—H), and 1077 (Si—O). DSC analysis showed the principal exotherm at 321° C. (FIG. 1). Char yield (TGA)=82% (FIG. 2). Reheating the char to 1000° C. in air resulted in only ~0.3% weight loss (FIG. 3). Holding the sample at 1000° C. in air for one hour resulted in an additional ~0.3% weight loss. The weight loss leveled off after approximately 40 minutes.

EXAMPLE 5

Preparation of polymer (20') from 25/75 of (40)/(50), respectively (y'/y≈3.0):

In the same manner outlined above, 1,4-dilithio-1,3-butadiyne (6.3 mmol) was reacted with a homogeneous mixture of (40) (0.71 mL, 1.58 mmol) and (50) (0.92 mL, 4.72 mmol). The usual workup gave a viscous dark brown material (1.3 g) which slowly solidified into a sticky solid. DSC analysis showed the principal exotherm at 299° C. (FIG. 4). Char yield (TGA)=76% (FIG. 5). Reheating the char to 1000° C. in air showed minimal weight loss (FIG. 6). Holding the sample at 1000° C. in air for one hour resulted in ~0.3% weight loss.

EXAMPLE 6

Preparation of polymer (20') from 10/90 of (40)/(50), respectively (y'/y≈9.0):

In the usual manner, 1,4-dilithio-1,3-butadiyne (6.3 mmol) was reacted with a homogeneous mixture of (40)

(0.29 mL, 0.63 mmol) and (50) (1.1 mL, 5.67 mmol). The usual workup gave a very viscous dark brown material (1.22 g) which slowly solidified into a sticky solid. DSC analysis showed the principal exotherm at 289° C. (FIG. 7). Char yield (TGA)=73% (FIG. 8). Reheating the char to 1000° C. in air resulted in 1% weight loss (FIG. 9). Holding the sample at 1000° C. in air for one hour resulted in no additional weight loss.

EXAMPLE 7
Preparation of polymer (20') from 50/50 of (40)/(50) respectively (y'/y≈1.0) using the stepwise method:

A mixture of 1,4-dilithio-1,3-butadiyne (6.3 mmol) in THF/hexane was cooled in a dry ice/acetone bath. To this mixture compound (40) (1.43 mL, 3.15 mmol) was added dropwise. After addition and without delay, compound (50) (0.62 mL, 3.15 mmol) was added dropwise. The addition of both components lasted approximately 15 min. Usual workup gave a material whose properties were virtually identical to those of the material described in the 50/50 homogeneous approach. Reversing the order of addition (i.e. adding (50) followed by (40) also gave similar material (20') wherein y'/y≈1.0.

EXAMPLE 8
Preparation of polymer (20') from 5/95 of (40)/(50), respectively (y'/y≈19.0) using the stepwise method:

In the usual manner, compounds (40) (0.14 mL, 0.31 mmol) and (50) (1.17 mL, 5.98 mmol) were added sequentially to a mixture of 1,4-dilithio-1,3-butadiyne (6.3 mmol) in THF/hexane cooled in a dry ice/acetone bath. The usual workup gave a viscous, dark brown material (1.2 g) which slowly solidified into a sticky solid. DSC analysis showed the principal exotherm at 290° C. (FIG. 10). Char yield (TGA)=66% (FIG. 11). Reheating the char to 1000° C. in air resulted in 16% weight loss (FIG. 12). Holding the sample at 700° C. in air for one hour resulted in an additional 13% weight loss after two hours.

EXAMPLE 9
Preparation of Polymer Where A=phenyl and E=oxygen and y'/y=1

Cool a mixture of 1,4-dilithio-1,3-butadiyne in THF/hexane using a dry ice/acetone bath. To this mixture add a homogeneous solution of 1,4-bis-dimethylchlorosilylbenzene and 40 (equal molar amounts) dropwise over a period of 15 min. After addition, remove the cold bath and stir the reaction mixture at room temperature for two hours. Pour the reaction mixture into an ice-cooled solution of saturated aqueous ammonium chloride with stirring. Filter the suspension through a Celite pad and separate the layers. Extract the aqueous layer twice with diethyl ether and wash the combined organic layers twice with distilled water and once with saturated aqueous sodium chloride solution. Dry the organic layer over anhydrous magnesium sulfate and filter. Remove volatiles by heating (no higher than 75° C.) under reduced pressure to leave the polymer. Note that in the final polymer of this example, x=x'=1, n=n'=2, u=1, q=q'=10, and $R^1$, $R^2$, $R^3$, $R^4$, $R^5$, $R^6$, $R^7$ and $R^8$ are —$CH_3$. Additional details for preparation of 1,4-bisdimethylchlorosilylbenzene are given by Sveda et al., in U.S. Pat. Nos. 2,561,429 (1951) and 2,562,000 (1951), each patent incorporated herein by reference in its entirety and for all purposes. Aditional details are given in U.S. Pat. Nos. 5,272,237; 5,292,779 and 5,348,917, each patent incorporated herein by reference in its entirety and for all purposes.

EXAMPLE 10
$(ClSi(CH_3)_2CH_2CH_2CH_2CH_2Si(CH_3)_2CH_2CH_2CH_2CH_2Si(CH_3)_2)_2CB_{10}H_{10}C(100)$

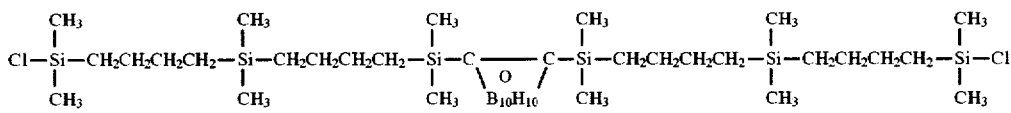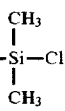

15

Prepare a THF solution of $BrMgCH_2CH_2CH_2CH_2MgBr$ (200) from 1,4-dibromobutane and two equivalents of magnesium. Add two equivalents of dimethylchlorosilane to form $HSi(CH_3)_2CH_2CH_2CH_2CH_2Si(CH_3)_2H$. Treat this compound with catalytic amounts of benzoyl peroxide in refluxing carbon tetrachloride to form $ClSi(CH_3)_2CH_2CH_2CH_2CH_2Si(CH_3)_2Cl$ (300). Treat a solution of (200) with one equivalent of (300) and one-half equivalent of $ClSi(CH_3)_2CB_{10}H_{10}CSi(CH_3)_2Cl$ to form the target material (100).

Alternatively, exemplary compound (300) may be formed according to the reaction:

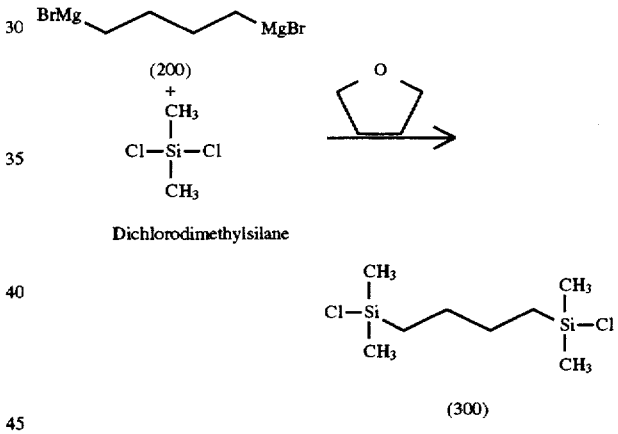

EXAMPLE 11
Preparation of Polymer Where E=A=—$(CH_2CH_2CH_2CH_2)$— and y'/y=1

Cool a mixture of 1,4-dilithio-1,3-butadiyne in THF/hexane using a dry ice/acetone bath. To this mixture add a homogeneous solution of 300 and 100 (equal molar amounts) dropwise over a period of 15 min. After addition, remove the cold bath and stir the reaction mixture at room temperature for two hours. Pour the reaction mixture into an ice-cooled solution of saturated aqueous ammonium chloride with stirring. Filter the suspension through a Celite pad and separate the layers. Extract the aqueous layer twice with diethyl ether and wash the combined organic layers twice with distilled water and once with saturated aqueous sodium chloride solution. Dry the organic layer over anhydrous magnesium sulfate and filter. Remove volatiles by heating (no higher than 75° C.) under reduced pressure to leave the polymer. Note that in the final polymer of this example, x=2, x'=1, n=n'=2, u=1, q=q'=10, and $R^1$, $R^2$, $R^3$, $R^4$, $R^5$, $R^6$, $R^7$ and $R^8$ are —$CH_3$.

What is claimed is:

1. An organoboron polymer with a backbone having a repeating unit comprising at least one carboranyl group, at least two acetylenic groups, and one or more silyl or siloxanyl groups wherein said repeating unit is represented by the formula:

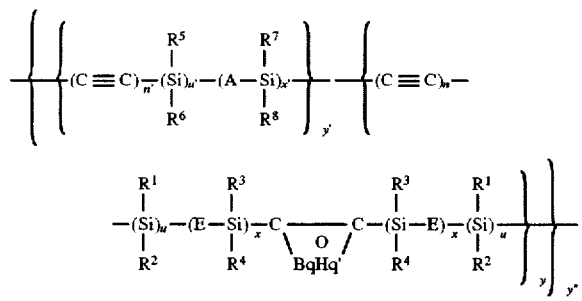

wherein:
- (1) n and n' are integers from 1 to 12 and u, u', y, y' and y" are positive integers wherein the ratio of y'/y is between about 0.01 to about 50;
- (2) —(C≡C)$_n$— and —(C≡C)$_{n'}$— represent unconjugated acetylenic moieties or conjugated acetylenic moieties when n and n' are integers greater than 1, respectively;
- (3) R$^1$, R$^2$, R$^3$, R$^4$, R$^5$, R$^6$, R$^7$ and R$^8$ are selected from the group consisting of saturated aliphatic, unsaturated aliphatic, aromatic, fluorocarbon moieties, and mixtures thereof;
- (4)

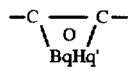

represents said carboranyl group; and
- (5) q and q' are integers from 3 to 16;
- (6) x and x' represent integers greater than or equal to zero;
- (7) A is selected from the group consisting of O, an aliphatic bridge, an aryl bridge and mixtures thereof;
- (8) E is selected from the group consisting of O, an aliphatic bridge, an aryl bridge and mixtures thereof; and
- (9) wherein E and A may be the same or different.

2. The organoboron polymer of claim 1 wherein said carboranyl group represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

3. The organoboron polymer of claim 1 wherein said carboranyl group represents a closo-dodecacarboranyl group selected from the group consisting of closo-dodeca-ortho-carboranyl, closo-dodeca-meta-carboranyl, closo-dodeca-para-carboranyl and mixtures thereof.

4. The organoboron polymer of claim 1 wherein said R$^1$, said R$^2$, said R$^3$, said R$^4$, said R$^5$, said R$^6$, said R$^7$, and said R$^8$ are the same or different and wherein each said R$^1$, said R$^2$, said R$^3$, said R$^4$, said R$^5$, said R$^6$, said R$^7$, and said R$^8$ represents a hydrocarbon group being selected from the group consisting of alkyl, aryl, alkylaryl, haloalkyl, haloaryl and mixtures thereof.

5. The organoboron polymer of claim 1 wherein said u, said u' and said y" are integers from 1 to 1000 and said x and said x' are integers from 0 to 1000 and said n and said n' are integers from 1 to 12.

6. The organoboron polymer of claim 1 wherein said u, said u' and said y" are integers from 1 to 500 and said x and said x' are integers from 0 to 500 and said n and said n' are integers from 1 to 10.

7. The organoboron polymer of claim 1 wherein said u, said u' and said y" are integers from 1 to 250 and said x and said x' are integers from 0 to 250 and said n and said n' are integers from 1 to 8.

8. The organoboron polymer of claim 1 wherein said u, said u' and said y" are integers from 1 to 100 and said x and said x' are integers from 0 to 100 and said n and said n' are integers from 1 to 6 and having a ratio of y'/y being between about 1 to about 25.

9. The organoboron polymer of claim 1 wherein said u and said u' are integers from 1 to 10 and said x and said x' are integers from 0 to 10 and said n and said n' are integers from 1 to 3 and having a ratio of y'/y being between about 5 to about 15.

10. The organoboron polymer of claim 1 wherein said u and said u' are integers from 1 to 6 and said x and said x' are integers from 0 to 2 and having a ratio of y'/y being between about 8 to about 12.

11. The organoboron polymer of claim 1 wherein said u, said u', said x, said x' are integers equal to 1 and said n and said n' are integers equal to 2 and having a ratio of y'/y being about 9.

12. A method for preparing a carborane-siloxane-acetylenic polymer or a carborane-silane-acetylenic polymer having the formula:

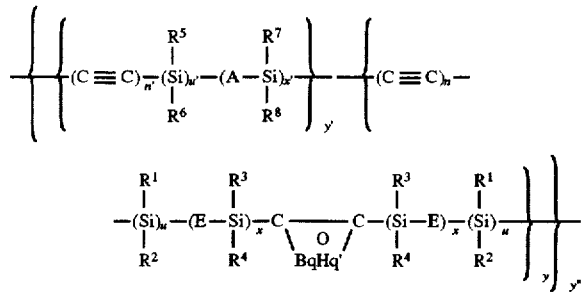

to provide said polymer wherein:
- (1) n and n' are integers from 1 to 12 and u, u', y, y' and y" are positive integers wherein the ratio of y'/y is between 0.01 to about 50;
- (2) —(C≡C)$_n$— and —(C≡C)$_{n'}$— represent unconjugated acetylenic moieties or conjugated acetylenic moieties when n and n' are integers greater than 1, respectively;
- (3) R$^1$, R$^2$, R$^3$, R$^4$, R$^5$, R$^6$, R$^7$ and R$^8$ are selected from the group consisting of saturated aliphatic, unsaturated aliphatic, aromatic, fluorocarbon moieties, and mixtures thereof;

(4)

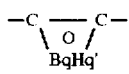

represents said carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl; closo-dodeca-ortho-carboranyl; closo-dodeca-meta-carboranyl; closo-dodeca-para-carboranyl and mixtures thereof;

(5) q and q' are integers from 3 to 16; and (6) x and x' represent integers greater than or equal to zero;

(7) A is selected from the group consisting of O, an aliphatic bridge, an aryl bridge and mixtures thereof;

(8) E is selected from the group consisting of O, an aliphatic bridge, an aryl bridge and mixtures thereof; and (9) wherein E and A may be the same or different comprising the step of:

reacting a salt or a Grignard agent having the formula:

$$M-(C\equiv C)_n-M$$

wherein:

(1) M is selected from the group consisting of Li, Na, K and MgX' where X' is selected from the group consisting of F, Cl, Br and I;

(2) n is a positive integer as previously indicated; with a mixture of compounds having the formulas:

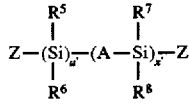

and

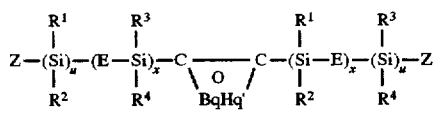

wherein:

(1) Z is selected from the group consisting of F, Cl, Br, I, and an acetyl group;

(2)

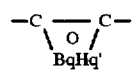

represents a moiety as previously indicated; and (3) $R^1$, $R^2$, $R^3$, $R^4$, $R^5$, $R^6$, $R^7$ and $R^8$ are as previously indicated; and (4) x, x', u, u', q and q' are integers as previously indicated (5) A is selected from the group consisting of O, an aliphatic bridge, an aryl bridge or mixtures thereof;

(6) E is selected from the group consisting of O, an aliphatic bridge, an aryl bridge or mixtures thereof; and (7) wherein E and A may be the same or different.

13. The method of claim 12 wherein A is an oxygen atom and E is an oxygen atom.

14. The method of claim 13 wherein Z represents an acetyl group.

15. The method of claim 13 wherein said $R^1$, said $R^2$, said $R^3$, said $R^4$, said $R^5$, said $R^6$, said $R^7$ and said $R^8$ are all methyl groups or all aryl groups or mixtures thereof.

16. The method of claim 13 wherein said u, said u' and said y" are integers from 1 to 1000 and said x and said x' are integers from 0 to 250 and said n and said n' are integers from 1 to 12.

17. The method of claim 13 wherein said u, said u' and said y" are integers from 1 to 100 and said x and said x' are integers from 0 to 100 and said n and said n' are integers from 1 to 10.

18. The method of claim 13 wherein said u and said u' are integers from 1 to 10 and said x and said x' are integers from 0 to 10 and said n and said n' are integers from 1 to 6 and having a ratio of y'/y between about 1 to about 25.

19. The method of claim 13 wherein said u and said u' are integers from 1 to 5 and said x and said x' are integers from 0 to 5 and said n and said n' are integers from 1 to 3 and having a ratio of y'/y between about 5 to about 15.

20. The method of claim 13 wherein said u, said u', said x and said x' are integers equal to 1 and said n and said n' are integers equal to 2 and having a ratio of y'/y of about 9.

21. A method for preparing a carborane-siloxane-acetylenic polymer or a carborane-silane-acetylenic polymer having the formula:

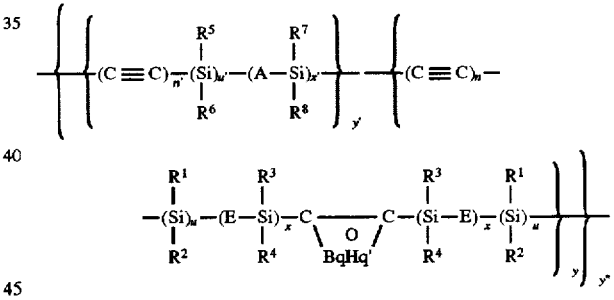

to provide said polymer wherein:

(1) n and n' are integers from 1 to 12 and u, u', y, y' and y" are positive integers;

(2) —(C≡C)$_n$— and —(C≡C)$_{n'}$— represent unconjugated acetylenic moieties or conjugated acetylenic moieties when n and n' are integers greater than 1, respectively;

(3) $R^1$, $R^2$, $R^3$, $R^4$, $R^5$, $R^6$, $R^7$ and $R^8$ are selected from the group consisting of saturated aliphatic, unsaturated aliphatic, aromatic, fluorocarbon moieties, and mixtures thereof;

(4)

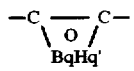

represents said carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7- dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl; closo-dodeca-ortho-carboranyl; closo-dodeca-meta-carboranyl; closo-dodeca-para-carboranyl and mixtures thereof;

(5) q and q' are integers from 3 to 16; and (6) x and x' represent integers greater than or equal to zero;

(7) A is selected from the group consisting of O, an aliphatic bridge, an aryl bridge and mixtures thereof;

(8) E is selected from the group consisting of O, an aliphatic bridge, an aryl bridge and mixtures thereof; and (9) wherein E and A may be the same or different comprising the step of:

reacting a salt or a Grignard agent having the formula:

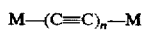

wherein:

(1) M is selected from the group consisting of Li, Na, K and MgX' where X' is selected from the group consisting of F, Cl, Br and I;

(2) n is a positive integer as previously indicated; with a stoichiometric mixture of compounds having the formulas:

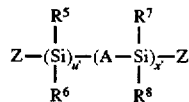

-continued and

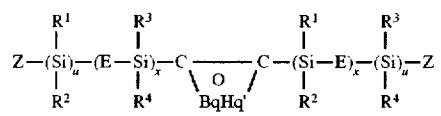

wherein:

(1) Z is selected from the group consisting of F, Cl, Br I, and an acetyl group;

(2)

$$-C\underset{BqHq'}{\overset{}{\diagdown O \diagup}}C-$$

represents a moiety as previously indicated; and (3) $R^1$, $R^2$, $R^3$, $R^4$, $R^5$, $R^6$, $R^7$ and $R^8$ are as previously indicated; and (4) x, x', u, u', q and q' are integers as previously indicated (5) A is selected from the group consisting of O, an aliphatic bridge, an aryl bridge or mixtures thereof;

(6) E is selected from the group consisting of O, an aliphatic bridge, an aryl bridge or mixtures thereof; and (7) wherein E and A may be the same or different.

* * * * *